May 25, 1937.  E. M. WATSON  2,081,783
FLASH LAMP SYNCHRONIZING DEVICE
Filed Jan. 10, 1936  2 Sheets-Sheet 1

Inventor:
Estell M. Watson,
by Harry E. Dunham
His Attorney.

Patented May 25, 1937

2,081,783

UNITED STATES PATENT OFFICE 2,081,783

FLASH LAMP SYNCHRONIZING DEVICE

Estell M. Watson, Cleveland Heights, Ohio, assignor to General Electric Company, a corporation of New York Application January 10, 1936, Serial No. 58,507

4 Claims. (Cl. 67—29)

My invention relates to photography and more particularly to apparatus for synchronizing a camera shutter with a light source.

The use of flashlamps of the type shown in Reissue Patent 18,678, Ostermeier, granted December 6, 1932, where it is desired to take pictures with exposure times of the range of .01 of a second requires that the shutter be timed to use as much as possible of the available light. Since the maximum of the flash is delayed approximately .02 to .03 of a second, it is necessary to have some kind of device which will delay the shutter by the same amount the flash is delayed after the closing of the lamp circuit. There are devices on the market at the present time which delay the shutter by about the same amount each time, without regard to the variation in the delay of the flash from the lamp caused by uncontrollable variations in manufacture. This results in occasional failure of the lamp and shutter to synchronize with the result that the negative is unsatisfactorily exposed.

It is evident that the most suitable means of adjusting the delay of the shutter to compensate for the variations in the delay of the flash from the lamps is to have the shutter controlled by the light from the lamp itself. Some work has been done along this line and the present invention is an advancement in the development of this type of apparatus.

One of the objects of my invention is to provide a synchronizing apparatus which will always open the camera shutter at the same time relative to the flash from the lamp. Another object is to provide an apparatus having a minimum number of parts so that it may operate rapidly and be operable with a minimum amount of energy.

One of the features of my invention is the provision of a magnetic holding means which holds the shutter actuating mechanism in an inoperative position and is caused to release the said shutter actuating mechanism when the flashlamp is energized or ignited. Further features and advantages of my invention will appear from the following description of species thereof and from the drawings.

Figure 1:
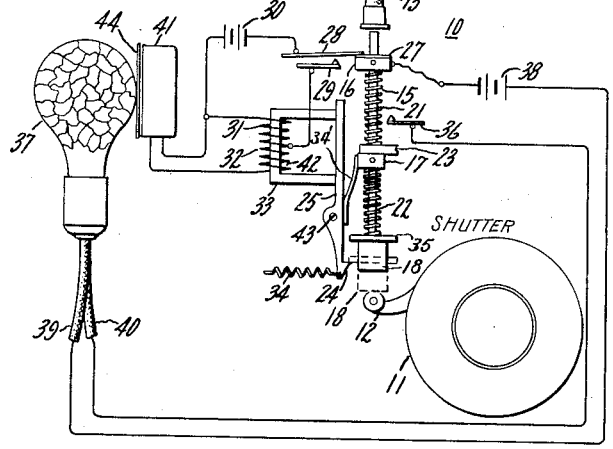
Figure 2:
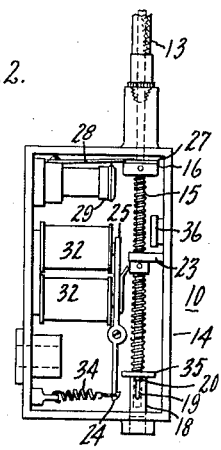
Figure 6:
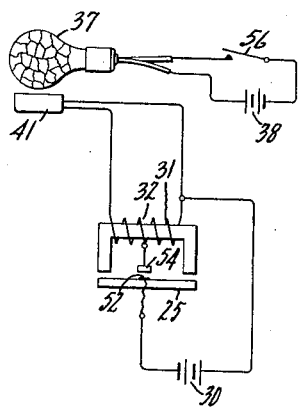
Figure 5:
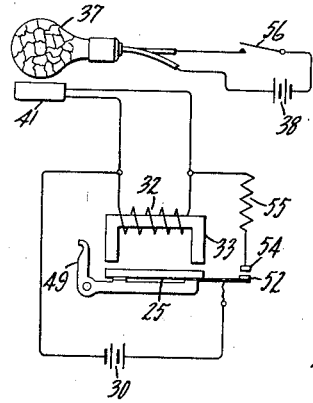
Figure 3:
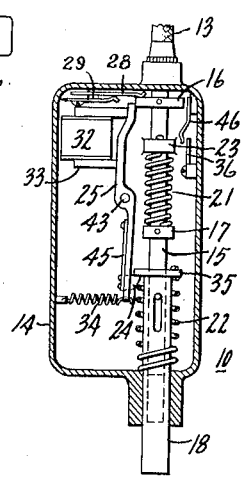
Figure 4:
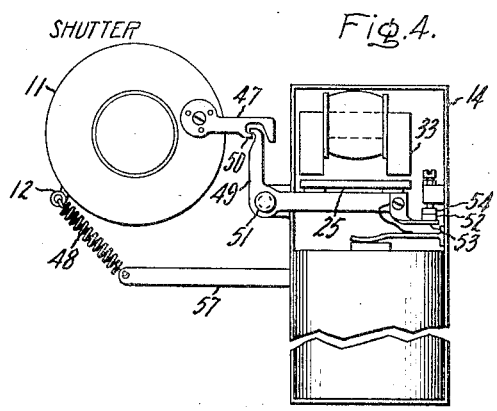
Figure 7:
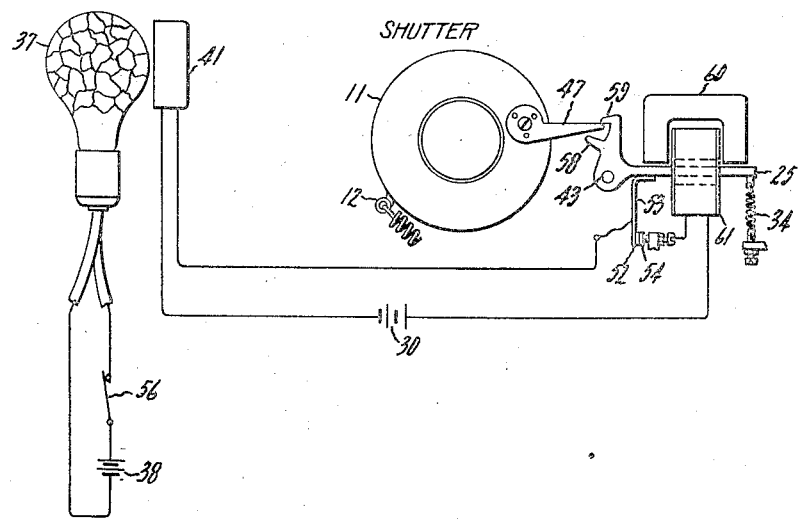

In the drawings, Fig. 1 is a diagrammatic view of apparatus comprising my invention; Fig. 2 is an elevation of the control mechanism therefor; Fig. 3 is an elevation of modified control mechanism; Fig. 4 is an elevation of a modified form of apparatus and Fig. 5 and Fig. 6 are wiring diagrams therefor; and Fig. 7 is a diagrammatic view of another modified apparatus.

Referring to Figs. 1 and 2, the control mechanism 10 is mounted adjacent the camera shutter 11 so as to engage the shutter release lever 12. The control mechanism comprises a cable release 13 which is fastened to the top of the synchronizer box 14 and is arranged to push a rod or plunger 15 downward. Two collars 16, 17 are rigidly fastened to rod 15 and a sleeve or plunger 18 on the lower end of rod 15 is allowed to move along the rod a short distance determined by the length of a slot 19 in plunger 18 which is engaged by a pin 20 on rod 15. There are coil springs 21, 22 on rod 15, the upper spring 21 bearing on collar 16 and on lug 23 on the wall of the box 14 and being used to return the said rod 15 and other mechanism to its normal position after a picture is taken. The lower spring 22 which bears on collar 17 and plunger 18 absorbs energy when rod 15 is pushed downward and releases it to propel the plunger 18 downward when it is allowed to move by being disengaged from the hook 24 on armature 25.

When a picture is to be taken, a button 26 on the shutter-release cable 13 is pressed. After the collar 16, which has an insulating washer 27 on its upper surface, has moved downwardly with plunger 15 a very short distance it allows leaf spring contact 28 to engage a contact 29. This closes a holding circuit including a battery 30 and the holding coil portion 31 of an electromagnet coil 32. This energizes the holding coil 31, setting up enough flux in the core 33 to hold the armature 25 in contact therewith against the pull of a spring 34. In the normal position and until just after contacts 28, 29 are closed, the armature 25 is also held against the core 33 by a leaf spring 34' which bears on collar 17. As the button 26 is further depressed, a flange 35 on plunger 18 comes to rest against the hook 24 on armature 25 as shown in dot-dash lines in Fig. 1. Additional movement of the button 26 brings it to the end of its travel when the collar 16 strikes a contact 36. This closes a circuit through a flashlamp 37, the circuit also including a battery 38 and conductors 39, 40. The light flux from said lamp falls on a light-sensitive cell 41 causing its resistance to become so low that enough current is allowed to flow through the release coil portion 42 of the coil 32 so that the reduced flux will no longer maintain armature 25 against the core 33. When the armature 25 is pivoted on the pin 43 by the pull of spring 34, the hook 24 releases the plunger 18, allowing it to be forced downward against the shutter release lever 12. This trips the shutter, taking a picture at a time when there is adequate light from the flashlamp 37. It is evident therefore that no variation in the time elapsed between closing the flashlamp circuit and the actual flash will disturb the proper synchronization of the flash and shutter. When the button 26 is released, the rod 15 returns to its initial position, opens the two circuits and leaves the armature 25 in position to take another picture after lamp 37 is replaced. If the apparatus should operate too rapidly, a translucent shield 44 may be placed between the cell 41 and the flashlamp 37. The cell 41 may be of the type manufactured by the Weston Electrical Instrument Corporation of Newark, N. J., and known as Model 594.

The control mechanism 10 shown in Fig. 3 may be used with the circuit shown in Fig. 1 and differs from the control mechanism 10 in Figs. 1 and 2 in that the springs 21 and 22 are tension springs rather than compression springs. The upper spring 21 is located between the lug 23 and the collar 17, while the lower spring 22 is located between the flange 35 on the plunger 18 and the lower end of the box 14. The hook 24 on the armature 25 is in this case made separate from the armature and is mounted in a slot in the lower end of said armature on a leaf spring 45. When the cable release button is pressed, the rod 15 is moved downward and the collar 16 allows the contact 28 to engage the contact 29, thereby closing the circuit to the holding portion 31 of the electro-magnet coil 32. Upon further downward movement of the rod 15 the collar 16 engages a contact 46 which in turn engages the contact 36 to close the circuit through the flashlamp 37. This causes sufficient flux to be introduced into the core 33 through the release coil portion 42 in opposition to the flux induced by the holding coil portion 31 to allow the spring 34 to rotate the armature 25 about the pin 43. The hook 24 is thereby pulled away from the flange 35 permitting the spring 22 to pull the plunger 18 downward and actuate the shutter release lever 12.

Figs. 4 and 5 show a modification used on a shutter 11 having a priming lever 47 in addition to the release lever 12. The release lever 12 is pulled down by a spring 48 so as to be inoperative which allows the priming lever to be moved up and down at will. The downward movement of the priming lever 47 primes the shutter actuating mechanism and the upward movement thereof opens and closes the shutter. To take a picture the priming lever 47 is first pushed down into engagement with lever 49 which is pushed over thereby so that it engages the finger or dog 50 extending from lever 47. In moving to this position, lever 49 is pivoted on pin 51 so that the contact 52 on the arm 53 thereon engages the contact 54 which closes the holding circuit of the device. The holding circuit comprises the battery 30, the coil 32 and the resistance 55. The coil 32 produces magnetic flux in the core 33 which attracts the armature 25 which is attached to the lever 49 and is held in the position shown by the flux in said core. The flashlamp 37 is now set off by closing switch 56 which closes the circuit including the battery 38 and said lamp. The light given off falls upon the light-sensitive cell 41 which is connected across the coil 32 and reduces the flow of current therethrough, causing the armature 25 to fall. The movement of the armature turns lever 49 so that it no longer engages the dog 50, whereupon the priming lever 47 swings upward and the shutter is operated. The control mechanism is mounted on the box 14 to which spring 48 is attached by arm 57.

Fig. 6 shows an alternative wiring diagram to that shown in Fig. 5. In this arrangement, resistance 55 has been eliminated and the holding circuit arranged so as to include battery 30 and only a holding coil portion 31 of coil 32. The magnetic pull of the holding circuit on the armature 25 is reduced as before by the light flash, causing the shutter to operate.

Fig. 7 shows another species of my invention which operates the camera shutter through the priming lever 47. The release lever 12 is held down so the priming lever can control all movements of the shutter. In this species the priming lever 47 is pushed down until it engages the tooth 58 of armature 25 which turns about pin 43 so that tooth 59 thereof engages the priming lever 47 as shown. The armature 25 is kept in this position by the magnetic attraction of a permanent magnet 60. In this position the armature also closes the circuit including the light-sensitive cell 41, the battery 30 and the coil 61 since the contact 52 on the arm 53 extending from said armature engages the contact 54. The flashlamp 37 is now set off by closing the circuit comprising as before the switch 56 and the battery 38 and the light given off falls upon the light-sensitive cell 41, inducing a magnetic flux in the armature 25, located within coil 61, which repels that of the permanent magnet 60. The attraction of the permanent magnet 60 for the armature 25 is lessened so that spring 34 turns it about pin 43, carrying tooth 59 away from the priming lever 47. The said priming lever 47 then swings upward and the shutter is actuated.

Obviously the circuits and mechanisms shown and described may be varied without departing from the scope of my invention.

What I claim as new and desire to secure by Letters Patent of the United States is:

1. In an apparatus of the type described, the combination of a flashlamp, a camera shutter, means for actuating said shutter, magnetic means for holding said shutter-actuating means in an inoperative position, means for energizing said flashlamp, a light-sensitive cell disposed adjacent said flashlamp, and an electrical circuit including said cell for repelling the magnetic flux in said holding means immediately after said flashlamp is energized and the light therefrom falls upon said light-sensitive cell thereby releasing said shutter-actuating means.

2. In an apparatus of the type described, the combination of a flashlamp, a camera shutter, means for actuating said shutter, an electro-magnet for holding said shutter-actuating means in an inoperative position comprising a coil and a core, a source of current electrically connected to said coil, means for energizing said flashlamp, and a light-sensitive cell disposed adjacent said flashlamp and electrically connected to the coil of said electro-magnet whereby when the flashlamp is energized current is caused to flow through said coil in the opposite direction to the current flow from said source of current to reduce the magnetic flux in said core thereby releasing said shutter-actuating means.

3. In an apparatus of the type described, the combination of a flashlamp, a camera shutter, a release lever on said shutter, a rod, a plunger slidably mounted on said rod and disposed adjacent said release lever, a spring located between portions of said rod and plunger, an electro-magnet comprising a coil and a core, an electrical circuit including said coil and a source of current and contacts disposed adjacent said rod and adapted to be closed by movement of said rod, a second electrical circuit including said flashlamp and a source of current and a pair of contacts adjacent said rod and adapted to be closed upon further movement of said rod, an armature adjacent said core and engaging said plunger, and a light-sensitive cell disposed adjacent the said flashlamp, said cell being electrically connected to said coil of said electro-magnet whereby when said rod is moved said first-mentioned electrical circuit is closed to energize said electro-magnet and hold said armature thereagainst and then said second-mentioned circuit is closed to energize said flashlamp thereby causing current to flow through the coil of said electro-magnet in the opposite direction to the current flow from the source of current in said first-mentioned circuit to reduce the magnetic flux in the core and thereby allow said armature to release said plunger and actuate the shutter-release lever.

4. In an apparatus of the type described, the combination of a flashlamp, means for energizing said flashlamp, a camera shutter, a shutter release lever, an armature disposed adjacent to and in engagement with said lever, a magnet for holding said armature in engagement with said lever, a coil disposed adjacent said magnet, a light-sensitive cell disposed adjacent said flashlamp, and an electrical circuit including a source of electrical energy and said cell and coil whereby when said flashlamp is energized and the light therefrom falls upon said light-sensitive cell a current is caused to flow through said coil and induce a magnetic flux which repels that of the magnet thereby releasing the said armature from its engagement with the said shutter-actuating lever.

ESTELL M. WATSON.